(12) United States Patent
Wakamatsu et al.

(10) Patent No.: US 7,663,827 B2
(45) Date of Patent: Feb. 16, 2010

(54) METHOD OF INITIALIZING PERPENDICULAR MAGNETIC RECORDING MEDIUM, PERPENDICULAR MAGNETIC RECORDING MEDIUM AND MAGNETIC RECORDING APPARATUS

(75) Inventors: Satoshi Wakamatsu, Odawara (JP); Makoto Nagao, Odawara (JP); Toshihide Ishioka, Odawara (JP); Atsushi Morooka, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 11/699,436

(22) Filed: Jan. 30, 2007

(65) Prior Publication Data
US 2007/0177291 A1    Aug. 2, 2007

(30) Foreign Application Priority Data
Jan. 30, 2006    (JP)    ............................. 2006-021264

(51) Int. Cl.
*G11B 5/86* (2006.01)
(52) U.S. Cl. ...................................................... 360/17
(58) Field of Classification Search ....................... None
See application file for complete search history.

(56) References Cited

U.S. PATENT DOCUMENTS

| 4,792,486 | A | * | 12/1988 | Ishizaka et al. | ............. 428/336 |
| 6,139,766 | A | * | 10/2000 | Taguchi et al. | ........... 252/62.57 |
| 6,747,823 | B2 | * | 6/2004 | Saito et al. | ..................... 360/17 |
| 6,813,105 | B2 | * | 11/2004 | Takano | ......................... 360/17 |
| 6,985,318 | B2 | * | 1/2006 | Clinton et al. | ................. 360/46 |
| 2003/0227701 | A1 | * | 12/2003 | Clinton et al. | ................. 360/46 |

OTHER PUBLICATIONS

Noel Abarra., et al Bulk AC-Erasure Technique for Perpendicular Recording Media: Effect of Exchange Coupling, IEEE Transactions on Magnetics, vol. 41, No. 10, Oct. 2005, pp. 3127-3129.

* cited by examiner

*Primary Examiner*—Mark Blouin
(74) *Attorney, Agent, or Firm*—Sughrue Mion, PLLC

(57) ABSTRACT

The present invention provides a method of initializing a perpendicular magnetic recording medium in which a magnetic field having a magnetic field strength Hex is applied to a perpendicular magnetic recording medium having a magnetic layer having a coercive force Hc to initialize the magnetic layer, the method comprising the steps of: controlling a magnetic field strength HexP in a direction parallel to the medium surface of the magnetic field so that HexP>1.3×Hc; and controlling a magnetic field strength HexV in a direction perpendicular to the medium surface of the magnetic field so that HexV<Hc.

7 Claims, 8 Drawing Sheets

METHOD OF INITIALIZING PERPENDICULAR MAGNETIC RECORDING MEDIUM, PERPENDICULAR MAGNETIC RECORDING MEDIUM AND MAGNETIC RECORDING APPARATUS

BACKGROUND OF THE INVENTION

1. Field of the Invention

The present invention relates to a method of initializing a perpendicular magnetic recording medium, a perpendicular magnetic recording medium and a magnetic recording apparatus. More particularly, the present invention relates to a method of initializing a perpendicular magnetic recording medium performed before the perpendicular magnetic transfer of a magnetic information pattern such as format information to a perpendicular magnetic recording disk used in a hard disk unit or the like, to a perpendicular magnetic recording medium to which perpendicular magnetic transfer is performed after initialization by the initialization method, and to a magnetic recording apparatus having the perpendicular magnetic recording medium.

2. Description of the Related Art

To a magnetic disk (hard disk) used in hard disk drives in increasing widespread use in recent years, format information and address information are ordinarily written before the disk is mounted in the drive after the disk has been delivered from a magnetic disk maker to a drive maker. This writing can be performed with a magnetic head. However, this writing can be performed more efficiently by a method of performing batch transfer from a master disk on which the format information and the address information are written. Therefore writing by this method is preferable.

This magnetic transfer technique uses a magnetic field generation device such as an electromagnet device or a permanent magnet device placed on one side or opposite sides of a master disk and a transfer destination disk (slave disk) held close to each other to apply a transfer magnetic field to the disks. A magnetic pattern corresponding to information provided on the master disk (e.g., a servo signal) is thereby transferred.

Magnetic recording mediums are divided into in-plane magnetic recording mediums having an axis of easy magnetization in an in-plane direction in their magnetic layers, and perpendicular magnetic recording mediums having an axis of easy magnetization in a direction perpendicular to the surfaces of their magnetic layers. In-plane magnetic recording mediums have been used in ordinary cases.

On the other hand, the development of perpendicular magnetic recording mediums and perpendicular magnetic recording methods with which a marked improvement in recording density (an increase in storage capacity) can be expected is being pursued and large-scale introduction of such mediums and methods into the market in near future is being cried out for.

Therefore, there is a demand for an arrangement for the above-described magnetic transfer adapted for perpendicular magnetic recording. That is, the development of the above-described magnetic transfer technique is being pursued with an eye to magnetic transfer to an in-plane magnetic recording medium in particular, and there is a demand for the development of a magnetic transfer technique applicable to perpendicular magnetic recording. As a technique indispensable for a stage preceding such magnetic transfer, a method of initializing a perpendicular magnetic recording medium (a method for entire-surface demagnetization by application of an external magnetic field) is to be mentioned.

Under the above-described circumstances, techniques relating to methods of initializing a perpendicular magnetic recording medium have been proposed (see the non-patent documents such as, IEEE Transactions on magnetics, vol. 41 (2005) 3127. "Bulk AC-Erasure Technique for Perpendicular Recording Media: Effect of Exchange Coupling", written by E. N. Abarra, Paramjit Gill, B. R. Acharya, J. Zhou, M. Zheng, G. Choe, and B. Demczyk).

In the above-described theses, methods for entire-surface-batch AC demagnetization by applying an external magnetic field and the resulting characteristics are described.

SUMMARY OF THE INVENTION

However, only a demagnetization method and the characteristics of demagnetization performed by the demagnetization method are described with respect to each of the methods proposed in the above documents. No mention is made of the specification of concrete optimum values, e.g., the strength of the applied magnetic field and the perpendicular magnetic field component of the applied magnetic field. Therefore, it is considerably difficult to perform initialization (demagnetization) of a perpendicular magnetic recording medium only based on either of the above-described methods.

In view of the above-described circumstances, an object of the present invention is to provide a perpendicular magnetic recording medium initialization method capable of suitably initializing (demagnetizing) a perpendicular magnetic recording medium before perpendicular magnetic transfer of a magnetic information pattern such as a format information pattern to the perpendicular magnetic recording medium, the perpendicular magnetic recording medium to which perpendicular magnetic transfer is performed after the completion of initialization by the initialization method, and a magnetic recording apparatus having the perpendicular magnetic recording medium.

To achieve the above-described object, the present invention provides a method of initializing a perpendicular magnetic recording medium in which a magnetic field having a magnetic field strength Hex is applied to a perpendicular magnetic recording medium having a magnetic layer having a coercive force Hc to initialize the magnetic layer, the method comprising controlling a magnetic field strength HexP in a direction parallel to the medium surface of the magnetic field so that HexP>1.3×Hc.

The present invention also provides a method of initializing a perpendicular magnetic recording medium in which a magnetic field having a magnetic field strength Hex is applied to a perpendicular magnetic recording medium having a magnetic layer having a coercive force Hc to initialize the magnetic layer, the method comprising controlling a magnetic field strength HexV in a direction perpendicular to the medium surface of the magnetic field so that HexV<Hc.

The present invention further provides a method of initializing a perpendicular magnetic recording medium in which a magnetic field having a magnetic field strength Hex is applied to a perpendicular magnetic recording medium having a magnetic layer having a coercive force Hc to initialize the magnetic layer, the method comprising controlling a magnetic field strength HexP in a direction parallel to the medium surface of the magnetic field so that HexP>1.3×Hc, and controlling a magnetic field strength HexV in a direction perpendicular to the medium surface of the magnetic field so that HexV<Hc.

According to the present invention, an externally applied magnetic field condition is specified as described above to achieve alternating current demagnetization of the perpendicular magnetic recording medium as desired, thereby enabling low-noise alternating current demagnetization to be performed in a shorter time in comparison with the method of demagnetization by head writing.

That is, there is a problem that a servo signal from a region adjacent to a direct-current-demagnetized region in the perpendicular magnetic recording medium is output in a biased state such as to badly influence servo following. However, this problem does not occur with the perpendicular magnetic recording medium alternating-current-demagnetized as in the present invention. According to present invention, therefore, an improvement in tracking accuracy can be achieved.

Details of the externally applied magnetic field condition will be described below according to the present invention.

Preferably, according to the present invention, a magnetic field generation device is provided and the perpendicular magnetic recording medium is alternating-current-demagnetized along a circumferential direction of the perpendicular magnetic recording medium by applying a magnetic field along the circumferential direction while moving the perpendicular magnetic recording medium relative to the magnetic field generation device. The entire surface of the perpendicular magnetic recording medium can be alternating-current-demagnetized collectively by applying an external magnetic field as described above.

The present invention further provides a perpendicular magnetic recording medium initialized by the above-described method of initializing a perpendicular magnetic recording medium, wherein the perpendicular magnetic recording medium undergoes magnetic transfer of a magnetic pattern formed of an array of magnetic layer portions on a surface of a perpendicular magnetic transfer master disk, which is a disk-like substrate, according to information to be transferred to the perpendicular magnetic recording medium, the magnetic transfer of the magnetic pattern to the perpendicular magnetic recording medium being performed by applying a transfer magnetic field while the perpendicular magnetic transfer master disk is being maintained in close contact with the perpendicular magnetic recording medium, and a magnetic recording apparatus having this perpendicular magnetic recording medium.

According to the present invention, the desired alternating current demagnetization of the perpendicular magnetic recording medium is achieved and, therefore, the performance of the perpendicular magnetic recording medium obtained by magnetic transfer thereafter performed and the performance of the magnetic recording apparatus incorporating this medium are also improved.

According to the present invention, as described above, initialization (demagnetization) of a perpendicular magnetic recording medium can be suitably performed to ensure improved perpendicular magnetic transfer.

DETAILED DESCRIPTION OF THE PREFERRED EMBODIMENTS

A preferred embodiment of a perpendicular magnetic recording medium initialization method, a perpendicular magnetic recording medium and a magnetic recording apparatus according to the present invention will be described with reference to the accompanying drawings.

A perpendicular magnetic recording medium (slave disk) applied in accordance with the present invention will be first described. A perpendicular magnetic recording medium is ordinarily called a slave disk because magnetic transfer from one perpendicular magnetic transfer master disk to a plurality of the perpendicular magnetic recording mediums is performed. The master disk is a substrate in disk form on which a pattern formed of an array of magnetic layer portions according to information to be transferred to the perpendicular magnetic recording mediums are formed in the surface.

Figure 1:
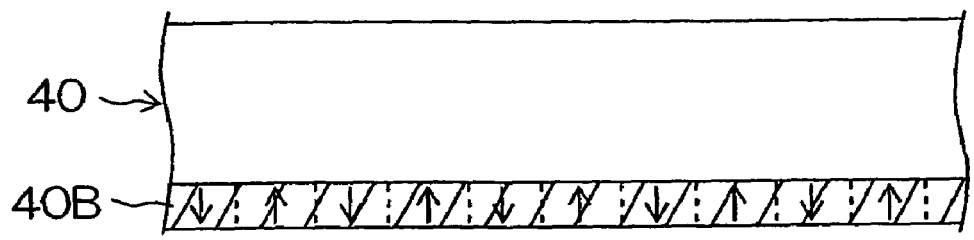
FIG. 1 is a sectional view of an essential portion of a slave disk.

FIG. 1 is a sectional view of an essential portion of a slave disk 40. A magnetic recording layer 40B is formed on a lower surface of a substrate of the slave disk 40. FIG. 1 is a schematic diagram showing the sizes of portions of the disk in proportions different from the actual proportions.

The slave disk 40 is a magnetic recording medium in the form of a disk such as a hard disk or a flexible disk having a magnetic recording layer formed on its two surfaces or one surface. The slave disk 40 undergoes cleaning processing (burnishing or the like) as required using a grinding head, an abrasive or the like to remove small projections on the surface or dust attached to the surface, before the slave disk 40 is brought into close contact with the master disk 46. Initialization (initial magnetization) according to the present invention is performed on the slave disk 40 in advance, as described below in detail.

As the slave disk 40, a magnetic recording medium in the form of a disk such as a hard disk, a high-density flexible disk or the like can be used. As the magnetic recording layer of the slave disk 40, an applied-type magnetic recording layer, a plating-type magnetic recording layer or a metal-thin-film-type magnetic recording layer can be adopted.

As the magnetic material of the metal-thin-film-type magnetic recording layer, any of Co, Co alloys (such as CoPtCr, CoCr, CoPtCrTa, CoPtCrNbTa, CoCrB and CoNi), Fe, and Fe alloys (FeCo, FePt and FeCoNi) can be used. These materials have high magnetic flux densities and magnetic anisotropy in the same direction as the magnetic field application direction (the perpendicular direction in the case of perpendicular magnetic recording) and are therefore capable of accurate transfer. Therefore these materials are preferable.

It is preferable to provide a nonmagnetic base layer under the magnetic material (on the supporting member side) in order to impart the necessary magnetic anisotropy. It is necessary to match the crystalline structure and lattice constants of the base layer to these of the magnetic layer. To do so, Ti, Cr, CrTi, CoCr, CrTa, CrMo, NiAl, Ru, Pd or the like is preferably used.

It is preferable to further provide a backing layer formed of a soft magnetic layer under the nonmagnetic base layer in order to stabilize the perpendicular magnetized state of the magnetic recording layer and improve the sensitivity at the time of recording/reproduction.

The thickness of the magnetic recording layer is preferably 10 to 500 nm, more preferably 20 to 200 nm. The thickness of the nonmagnetic layer is preferably 10 to 150 nm, more preferably 20 to 80 nm. The thickness of the backing layer is preferably 50 to 2000 nm, more preferably 80 to 400 nm.

In the slave disk 40 shown in FIG. 1, a perpendicular magnetic pattern having orientations indicated by the arrows is recorded in the magnetic recording layer 40B. The perpendicular magnetic pattern having upward and downward orientations mixedly set is made uniform in one orientation (e.g., in the downward orientation) by initialization (initial magnetization) described below.

Figure 2:
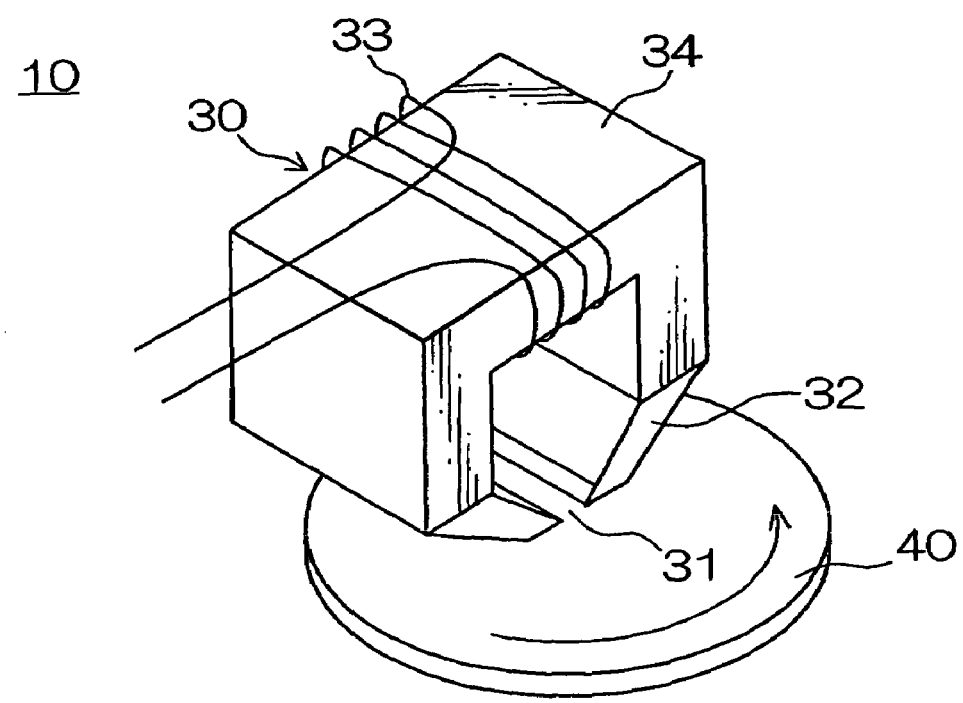
FIG. 2 is a perspective view of an essential portion of a demagnetization device.
Figure 3:
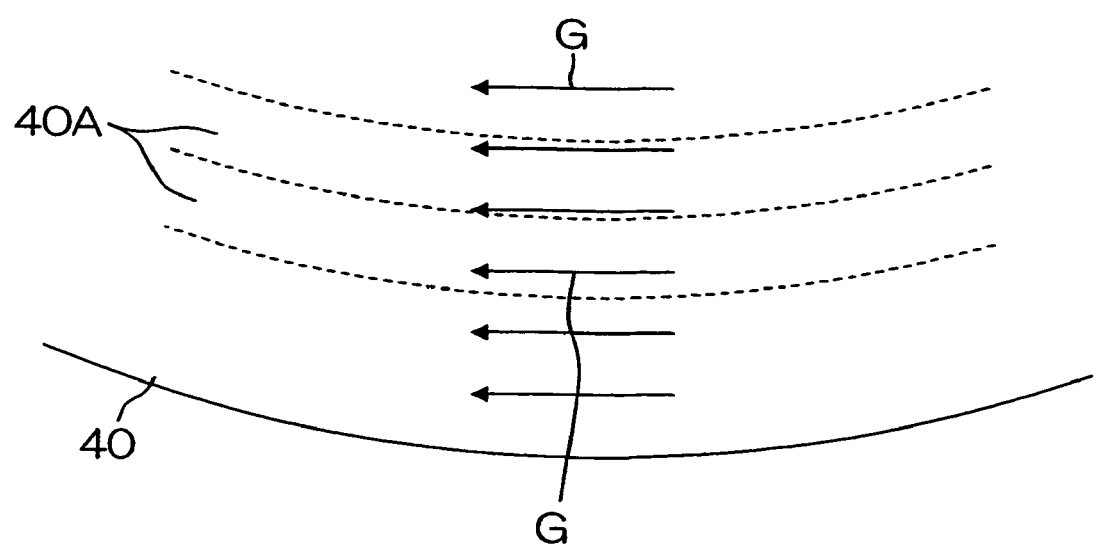
FIG. 3 is a plan view showing a method of applying a magnetic field for demagnetization.

An apparatus used in a method of initializing the perpendicular magnetic recording medium according to the present invention will be described. FIG. 2 is a perspective view of an essential portion of a demagnetization device. FIG. 3 is a plan view showing a method of applying a magnetic field for demagnetization.

The demagnetization device 10 shown in FIG. 2 is capable of performing alternating current demagnetization at the time of initial magnetization by applying a demagnetizing magnetic field from a magnetic field generation device 30, with the slave surface (the surface on the magnetic recording layer 40B side) of the slave disk 40 facing upward.

The magnetic field generation device 30 for applying a demagnetizing magnetic field is constructed by disposing on the upper side an electromagnet device 34 formed by winding a coil 33 around a core 32 having a gap 31 extending along a radical direction of the slave disk 40 held on a rotating drive device, and is capable of applying a demagnetizing magnetic field having magnetic force lines G parallel to a track 40A direction (see FIG. 3).

When a magnetic field is applied, the rotating drive device is arranged to rotate the slave disk 40 while a demagnetizing magnetic field is being applied to the slave disk 40 by the magnetic field generation device 30. Another arrangement may alternatively be adopted in which the magnetic field generation device 30 is moved by being rotated.

Figure 4:
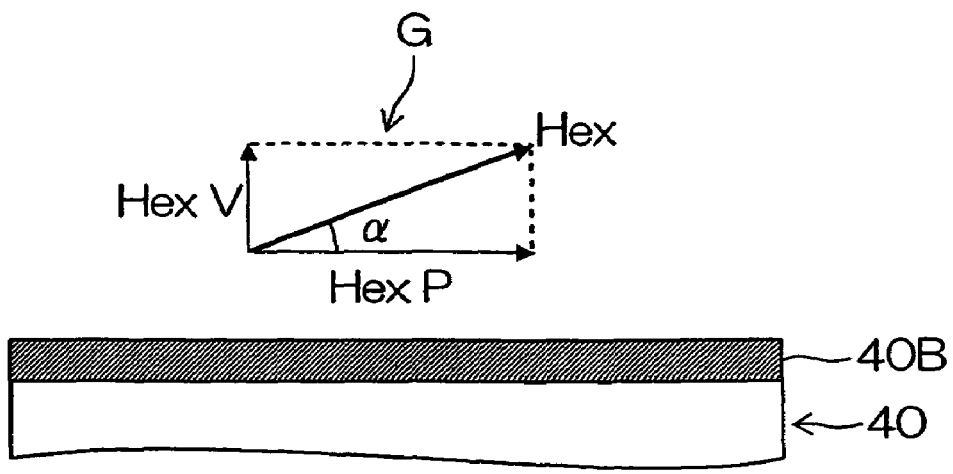
FIG. 4 is a diagram schematically showing the direction of a demagnetizing magnetic field applied to a magnetic recording layer.

The demagnetizing magnetic field (external magnetic field) applied by the magnetic field generation device 30 will be described. FIG. 4 is a diagram schematically showing the direction of the demagnetizing magnetic field (magnetic force lines) G applied to the magnetic recording layer 40B. The demagnetizing magnetic field G is illustrated above the magnetic recording layer 40B in FIG. 4. In actuality, however, the demagnetizing magnetic field G is applied to an internal portion of the magnetic recording layer 40B.

Referring to FIG. 4, the demagnetizing magnetic field G is at an angle α from a horizontal plane (the surface of the magnetic recording layer 40B). As illustrated, the magnetic field strength in a direction parallel to the recording surface is HexP, and the magnetic field strength in a direction perpendicular to the recording surface is HexV.

It is required that the magnetic field strength of the demagnetizing magnetic field G be in one of the following relationships (1) to (3) with the coercive force Hc of the magnetic recording layer 40B of the slave disk 40.

(1) The magnetic field strength HexP in the parallel direction is controlled so as to satisfy HexP>1.3×Hc.

(2) The magnetic field strength HexV in the perpendicular direction is controlled so as to satisfy HexV<Hc.

(3) The magnetic field strength HexP in the parallel direction is controlled so as to satisfy HexP>1.3×Hc, and the magnetic field strength HexV in the perpendicular direction is controlled so as to satisfy HexV<Hc.

That is, the inventors of the present invention have found that if the magnetic field strength of the demagnetizing magnetic field G is specified as described above, low-noise alternating current demagnetization can be performed in a shorter time in comparison with the method of demagnetization by head writing.

That is, there is a problem that a servo signal from a region adjacent to a direct-current-demagnetized region in the perpendicular magnetic recording medium is output in a biased state such as to badly influence servo following. However, this problem does not occur with the perpendicular magnetic recording medium alternating-current-demagnetized as in the present invention. According to present invention, therefore, an improvement in tracking accuracy can be achieved.

Detailed description will be made later in an embodiment of the magnetic field strength of the demagnetizing magnetic field.

Description will now be made of magnetic transfer to the perpendicular magnetic recording medium alternating-current-demagnetized by the perpendicular magnetic recording medium initialization method of the present invention.

Figure 5:
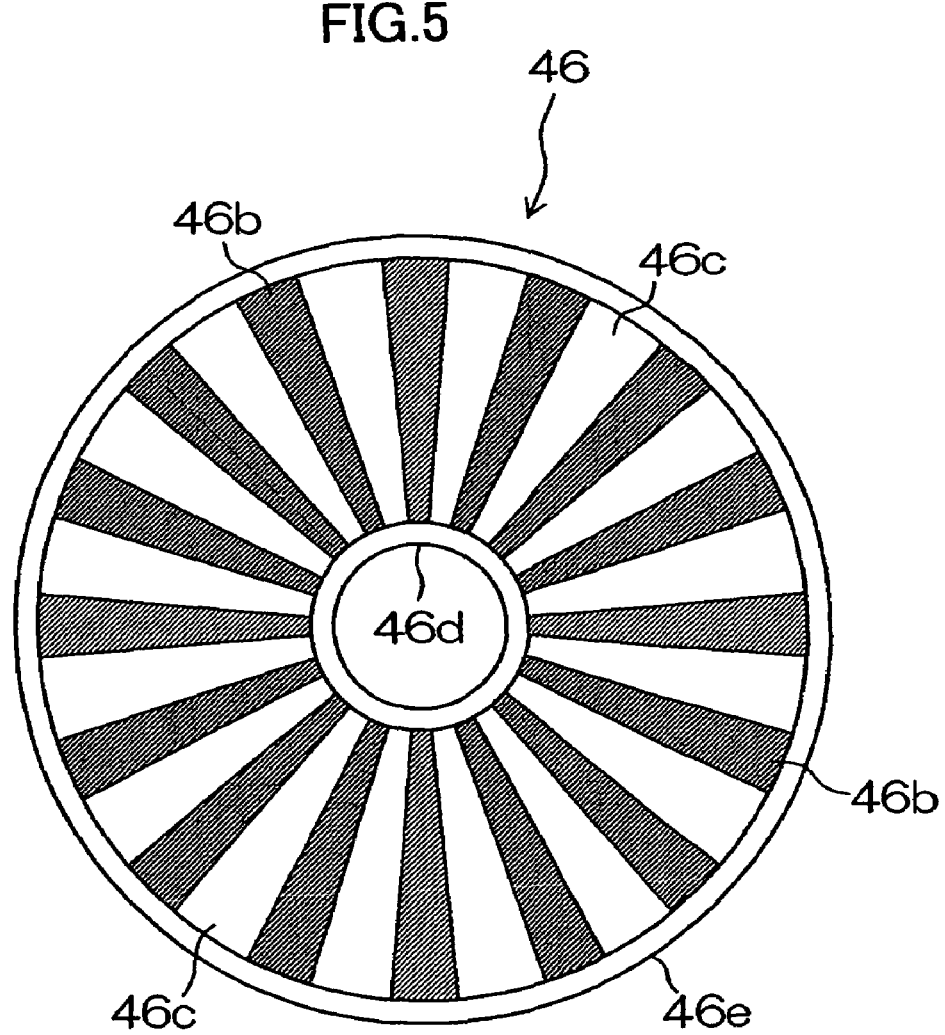
FIG. 5 is a plan view of a master disk.
Figure 6:
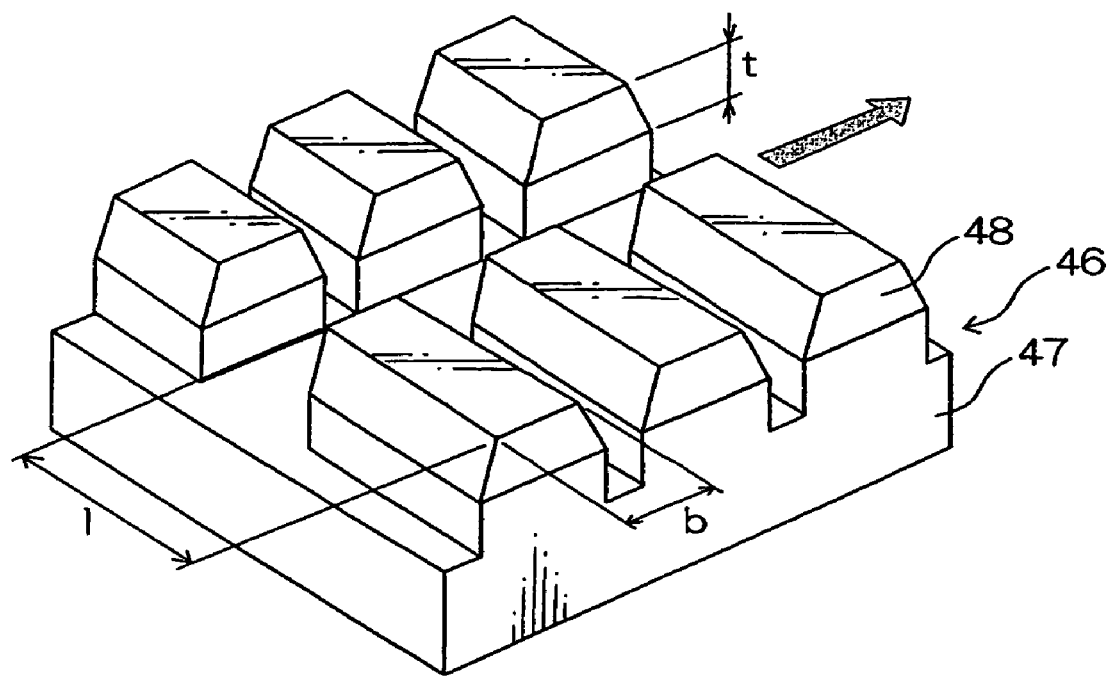
FIG. 6 is an enlarged perspective view of a portion of the master disk showing a fine projection-recess pattern in the surface.

Description will be first made of the master disk 46 used for magnetic transfer. FIG. 5 is a plan view of the master disk. FIG. 6 is an enlarged perspective view of a portion of the master disk 46 showing a fine projection pattern in the surface. FIG. 6 is a schematic diagram showing the sizes of portions of the disk in proportions different from the actual proportions.

As shown in FIG. 5, the master disk 46 is provided in the form of a flat circular plate, and a servo region 46b indicated by hatching and a non-servo region 46c (non-hatched portion) are formed alternately along the circumferential direction in a portion of the master disk 46 at an intermediate position in the radial direction (a portion other than an inner peripheral portion 46d and an outer peripheral portion 46e of the master disk 46).

The servo region 46b is a region where a magnetic pattern (servo information pattern) is formed, while the non-servo region 46c is a region where no magnetic pattern (servo information pattern) is formed.

The master disk 46 is in the form of an annular plate (doughnut plate) having an inside diameter. The master disk 46 may alternatively be in the form of a circular plate having no inside diameter.

Referring to FIG. 6 showing an enlarged view of a portion of the servo region 46b, a transfer information recording surface in which a fine projection pattern formed of a magnetic layer 48 is formed is formed in one surface of a substrate 47. The opposite surface of the substrate 47 is held on a close-contact device (not shown). The fine projection pattern is formed, for example, by a photofabrication method described below. The one surface (transfer information recording surface) of the master disk 46 is a surface to be brought into close contact with the slave disk 40.

The fine projection pattern has elements formed of magnetic layer 48 having a thickness t. Each element is rectangular as seen in plan and has a length b in the track direction (the direction indicated by the thick arrow in the figure) and a length l in the radial direction. The optimum values of the lengths b and l depend on the recording density, the recording signal waveform and other factors. The lengths b and l may be set to, for example, 80 nm and the 100 nm, respectively.

The elements of the fine projection pattern are formed by being elongated in the radial direction for a servo signal. For example, in this case, the length 1 in the radial direction is preferably 0.05 to 20 μm and the length b in the track direction (circumferential direction) is preferably 0.05 to 5 μm. Elements elongated in the radial direction to have a length in this range are preferred for a pattern for recording servo signal information.

The depth of the fine projection pattern (the height of projections) in the surface of the substrate 27 is in the range preferably from 80 to 800 nm, more preferably from 100 to 600 nm.

If the substrate 47 of the master disk 46 is a ferromagnetic material having, for example, Ni as a main constituent, magnetic transfer from the substrate 47 only is possible and it is not necessary to form the magnetic layer 48. However, the magnetic layer 48 having good transfer characteristics may be formed to ensure improved magnetic transfer. If the substrate 47 is nonmagnetic, it is necessary to provide the magnetic layer 48. It is preferred that the magnetic layer 48 of the master disk 46 be a soft magnetic layer having a coercive force Hc of 48 kA/m (≈600 Oe) or less.

As the substrate 47 of the master disk 46, a material selected from nickel, silicon, any of glasses of various compositions, e.g., quartz glass, aluminum, an alloy, any of ceramics of various compositions, a synthetic resin and other materials may be used. It is necessary that a synthetic resin selected as the substrate 47 be a material not denatured by a resist remover in a liftoff step in a photofabrication process, or it is necessary to adopt a measure (e.g., forming a protective coat) to prevent the synthetic resin from being denatured by the resist remover.

Forming of the projection-recess pattern in the surface of the substrate 47 may be performed, for example, by a photofabrication method or a stamper method using a master formed by a photofabrication method or the like.

Forming of a master by a stamper method is performed, for example, as described below. A layer of a photoresist is formed by spin coating or the like on a smooth surface of a glass plate (or a quartz glass plate) and undergoes prebaking. Thereafter, substantially the entire surface of photoresist layer is exposed to a predetermined pattern of laser light (or an electron beam) modulated according to a servo signal while the glass plate is being rotated. For example, the portion of the photoresist layer corresponding to each frame on the circumference is exposed to a pattern linearly extending radially from the center of rotation in correspondence with the servo signal for each track.

Development processing is thereafter performed on the photoresist layer to obtain a glass master having a projection-recess configuration formed by the photoresist layer from which the exposed portions have been removed. Plating (electroforming) to a predetermined thickness is performed on the surface of the glass master on the basis of the projection-recess pattern in the surface of the glass master, thereby making a Ni substrate having a positive projection-recess pattern in the surface. This substrate is then separated from the glass master.

This substrate is immediately used as a press master, or is formed as a press master by forming layers such as a soft magnetic layer and a protective film on the projection-recess pattern as required.

A reversal master having a negative projection-recess pattern may alternatively be formed in an electroforming manner by a process of forming a second master by performing plating on the glass substrate in an electroforming manner and further performing plating on the second master. Further, a substrate having a positive projection-recess pattern may alternatively be formed by a process of forming a third master by performing plating on the second master in an electroplating manner or by pressing a resin of a low viscosity against the second master and setting the resin and a process of performing plating on the third master in an electroplating manner.

Forming of a master by a photofabrication method is performed, for example, as described below. A layer of a photoresist is formed by spin coating or the like on a smooth surface of a substrate in the form of a flat plate and undergoes prebaking. Thereafter, substantially the entire surface of photoresist layer is exposed to a predetermined pattern of laser light (or an electron beam) modulated according to a servo signal while the substrate is being rotated. For example, the portion of the photoresist layer corresponding to each frame on the circumference is exposed to a pattern linearly extending radially from the center of rotation in correspondence with the servo signal for each track.

Development processing is thereafter performed on the photoresist layer to obtain a substrate having a projection-recess configuration formed by the photoresist layer from which the exposed portions have been removed. Postbaking is performed on the substrate after the development processing to increase the strength of attachment of the photoresist layer to the substrate.

Subsequently, the substrate is etched in an etching step to form pits having depths corresponding to the projection-recess pattern. The photoresist is thereafter removed and the surface of the substrate is polished. If burrs exist, they are removed and the surface is smoothed, thereby obtaining a master having a projection-recess configuration.

Subsequently, plating (electroforming) to a predetermined thickness is performed on the surface of the master on the basis of the projection-recess pattern in the surface of the master, thereby making a Ni substrate having a negative projection-recess pattern in the surface. This substrate is then separated from the master.

As a metal for the material of the substrate or the master formed by electroforming, Ni or a Ni alloy may be used. As a plating method for forming the substrate, any of various metal film forming methods including nonelectrolytic plating, electroforming, sputtering and ion plating may be applied.

Figure 7A:
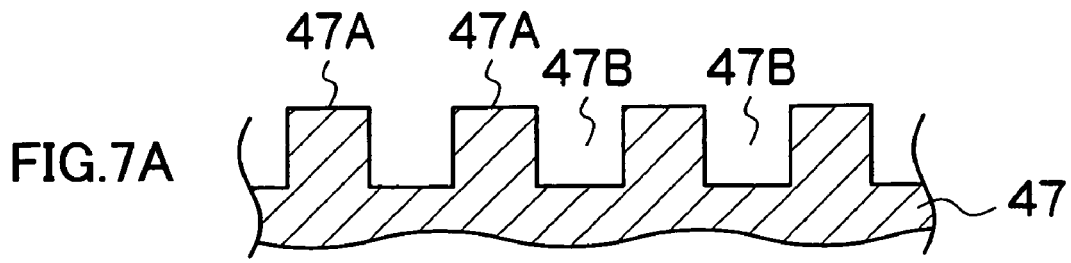
FIGS. 7A to 7E are sectional views of a substrate for explaining the flow of processing for forming a magnetic layer.

A method of forming the magnetic layer 48 will be described. FIGS. 7A to 7E are sectional views of the substrate 47 for explaining the flow of processing for forming the magnetic layer 48. FIG. 7A shows the substrate 47 in an untreated state. A multiplicity of fine projection pattern elements 47A and recesses 47B formed between the projection pattern elements 47A are alternately formed on the surface of the substrate 47 by the process described above.

Figure 7B:
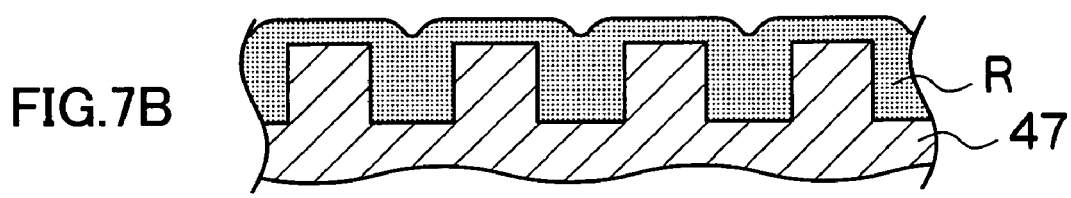

First, as shown in FIG. 7B, a resist R is applied to the surface of the substrate 47 to cover the surfaces of the projection pattern elements 47A with the resist R and to substantially fill the recesses 47B with the resist R. A photoresist is ordinarily used as the resist R. Any of various materials other than photoresists may be used if it is capable of a liftoff step described below, not limited to photoresist.

As a method of applying the resist R, any of well-known various methods, e.g., spin coating, die coating, roll coating, dip coating and screen printing may be adopted. If the size of the recesses 47B is extremely small, and if the viscosity of the resist R is equal to or higher than a predetermined value, difficulty in substantially filling the recesses 47B may occur. In such a case, the viscosity of the resist R may be reduced by dilution for example.

A method of applying the resist R to the surface of the substrate 47 in a decompressed atmosphere (for example, by putting the substrate 47 in a desiccator and evacuating the interior of the desiccator with a rotary vacuum pump or the like) and thereafter releasing the substrate 47 with the resist R to the atmospheric pressure is also effective in filling the small recesses 47B with the resist R.

A method of putting the substrate 47 in a desiccator, applying the resist R to the surface of the substrate 47 under the atmospheric pressure and thereafter evacuating the interior of the desiccator with a rotary vacuum pump or the like is also effective in filling the small recesses 47B with the resist R. In this case, air bubbles are generated in the resist R in the recesses 47B by evacuation and disappear from the surface of the resist R.

Subsequently, the resist R is set in the state shown in FIG. 7B. If the resist R is a negative photoresist (e.g., a cyclized rubber type), it may be cross-linked by being irradiated with ultraviolet rays or the like. If the resist R is a positive photoresist, it may be cross-linked by baking (postbaking).

Figure 7C:
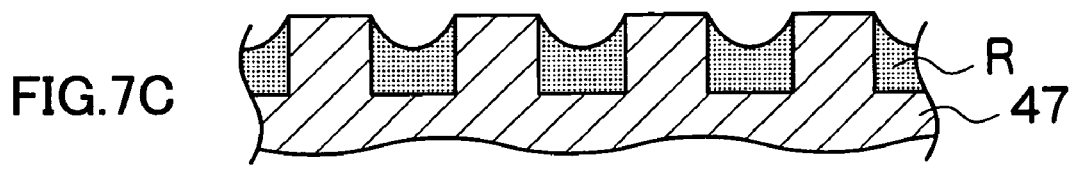

Subsequently, as shown in FIG. 7C, the resist R covering the surfaces of the projection pattern elements 47A is completely removed by ashing, and part of the resist R substantially filling the recesses 47B is removed.

That is, since there is a difference between the thickness of the resist R covering the surfaces of the projection pattern elements 47A and the thickness of the resist R filling the recesses 47B, the resist R filling the recesses 47B remains in the state of covering the bottom surfaces of the recesses 47B when the resist R covering the surfaces of the projection pattern elements 47A is completely removed.

Figure 7D:
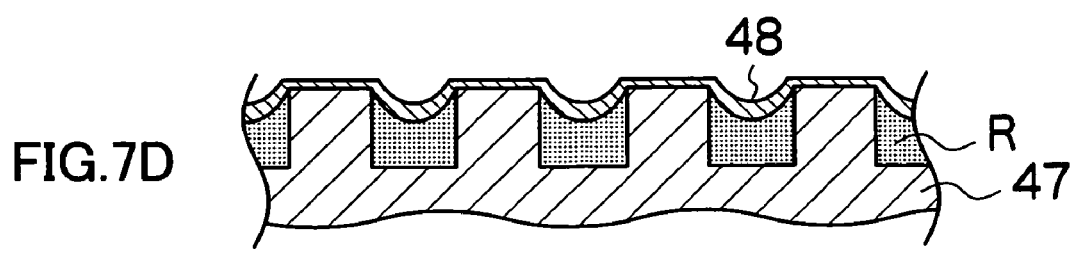

Subsequently, as shown in FIG. 7D, a magnetic film is formed on the surface of the substrate 47 to form the magnetic layer 48 on the surfaces of the projection pattern elements 47A from which the resist R has been completely removed and on the surfaces of the resist R remaining in the recesses 47B.

Film forming for forming the magnetic layer 48 (soft magnetic layer) is performed by a vacuum film forming such as vacuum deposition, sputtering or ion plating, plating or the like from a magnetic material. As the magnetic material of the magnetic layer 48, Co, a Co alloy (such as CoNi, CoNiZr or CoNbTaZr), Fe, a Fe alloy (FeCo, FeCoNi, FeNiMo, FeAlSi, FeAl or FeTaN), Ni or a Ni alloy (NiFe) may be used. In particular, FeCo or FeCoNi can be preferably used.

The thickness t of the magnetic layer 48 is in the range preferably from 50 to 10000 nm, more preferably from 100 nm to 5000 nm. That is, it is preferable to set the ratio t/b of the thickness t of the magnetic layer 48 and the width of the projection pattern elements (in this case the length b in the track direction shown in FIG. 2) to 1 or more. If the ratio of the thickness t of the magnetic layer 48 and the width b of the projection pattern elements is set to this value, the direction of magnetization of the magnetic layer 48 can be maintained perpendicularly to the disk surface with stability to ensure that the master disk 46 can be preferably used as a master disk for perpendicular magnetic transfer.

It is preferable to provide a protective film such as diamondlike carbon film on the magnetic layer 48. A lubricant layer may be further provided on the protective film. In such a case, it is preferable to form a diamondlike carbon film having a thickness of 5 to 30 nm as a protective film and a lubricant layer. A close contact enhancement layer such as a Si layer may also be provided between the magnetic layer 48 and the protective film. The lubricant is effective in limiting the reduction in durability, e.g., the occurrence of scratches due to friction at the time of correction of a misalignment occurring in the process of being brought into contact with the slave disk 40.

Figure 7E:
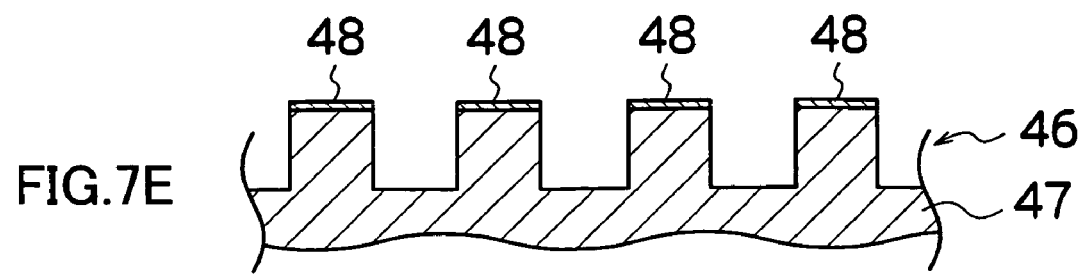

The resist R in the recesses 47B is thereafter removed. The magnetic layer 48 on the resist R surface is simultaneously removed. As a result, the perpendicular magnetic transfer master disk 46 having the magnetic layer 48 formed only on the surfaces of the projection pattern elements 47A is obtained, as shown in FIG. 7E. That is, the liftoff step for selectively removing the magnetic layer 48 in the recesses 47B is performed.

As a method of removing the resist R in the recesses 47B, a method using a special-purpose remover solution is ordinarily used if the resist R is a photoresist. It seems that the remover solution cannot easily act on the resist R since the resist R surface is covered with the magnetic layer 48. In actuality, however, the remover solution permeates through pinholes or the like in the magnetic layer 48 to act on the resist R.

Also, a method of applying ultrasonic vibration and/or controlling the temperature of the remover solution to accelerate the action of the remover solution can be preferably adopted.

Further, a method of leaving in a heating atmosphere not denaturing the magnetic layer 48 (for example, in an oven) for a predetermined time period to decompose the resist R by braking without using the remover solution can be adopted. Since the photoresist is an organic material, it disappears by changing into $CO_2$ and $H_2O$ when left in a heating atmosphere (e.g., an oxygen-containing atmosphere at a hundred and several ten degrees C.).

Figure 8:
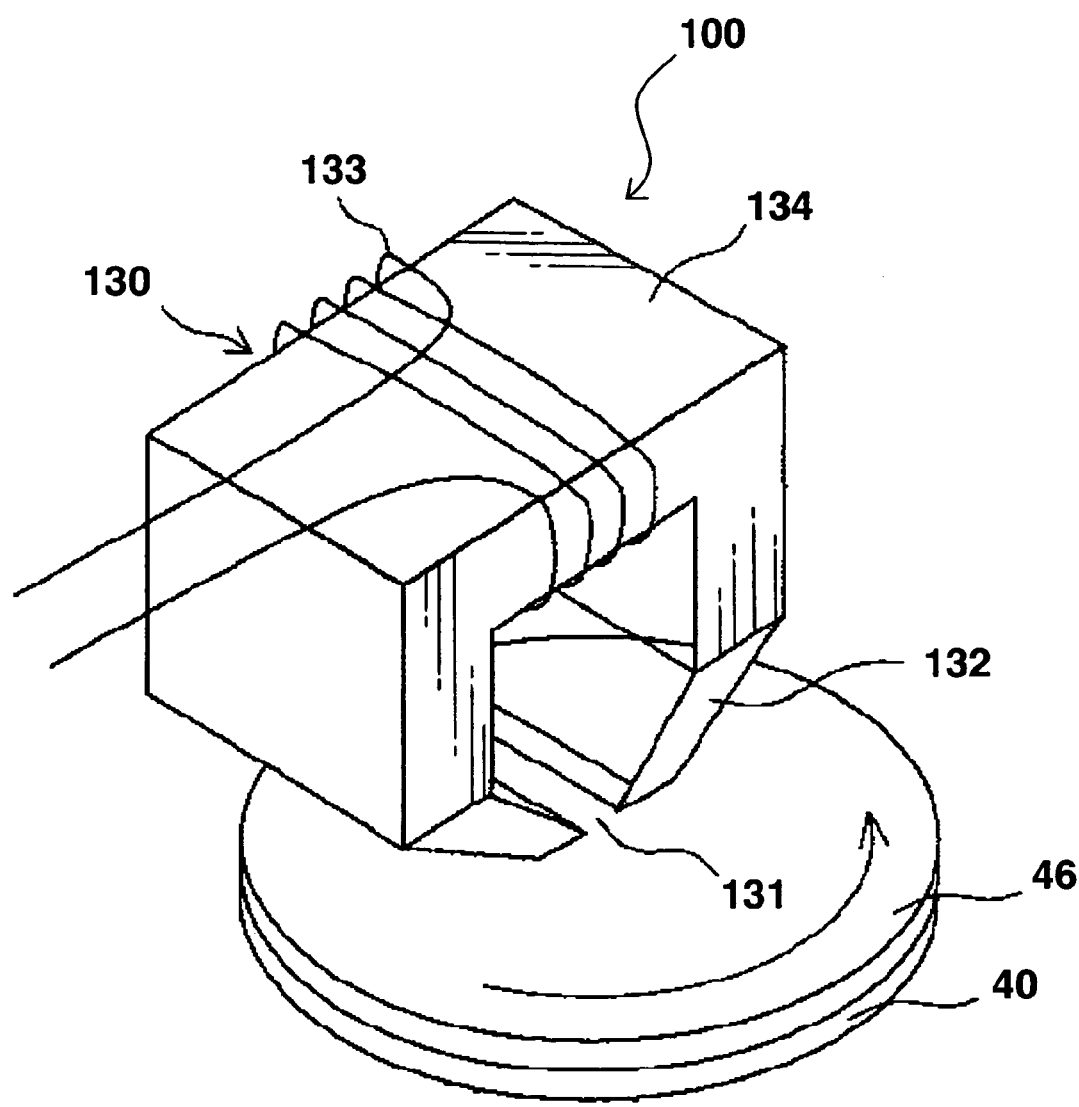
FIG. 8 is a perspective view of an essential portion of a magnetic transfer device.

A magnetic transfer method for transferring the magnetic layer pattern on the master disk 46 to the slave disk 40 provided as a transfer destination disk will be described. FIG. 8 is a perspective view of an essential portion of a magnetic transfer device 100 for carrying out magnetic transfer by using the master disk 46.

The magnetic transfer device 100 can bring the slave surface (magnetic recording surface) of the slave disk 40 into contact with the information recording surface of the master disk 46 and maintain these surfaces in close contact with each other by a predetermined pressing force during the magnetic transfer. The magnetic transfer device 100 can also transfer and record the magnetic pattern for the servo signal for example by applying a transfer magnetic field from a magnetic transfer head 130 provided as a magnetic field generation device while maintaining the slave disk 40 and the master disk 46 in close contact with each other.

Magnetic transfer using the master disk 46 comprises one-side successive transfer to one surface of the slave disk 40 in a state where the master disk 46 is maintained in close contact with the one surface of the slave disk 40 as shown in FIG. 8, and two-side simultaneous transfer to the two surfaces of the slave disk 40 in a state where the master disks 46 are maintained in close contact with the two surfaces of the slave disk 40. If necessary, cleaning processing is performed on the master disk 46 to remove attached dust before being brought into close contact with the slave disk 40.

A magnetic field generation device 133 for applying a transfer magnetic field is constructed by placing on the upper side an electromagnet device 134 formed by winding a coil 133 around a magnetic core 132 having a gap 131 extending along the radial direction of the slave disk 40 and the master disk 46 held by the close-contact device, and is capable of applying a transfer magnetic field having magnetic force lines G parallel horizontally along the track direction.

That is, as shown in FIG. 8, the magnetic transfer head 130 comprises an electromagnet in the form of a ring constituted by the magnetic core 132 made of a ferromagnetic material, and having a winding 133.

A rotating drive device is provided to rotate the slave disk 40 and the master disk 46 integrally with each other, that is, moving the slave disk 40 and the master disk 46 relative to the magnetic transfer head 130 in the direction of the arrow, while a transfer magnetic field TG is being applied by the magnetic transfer head 130 to magnetically transfer and record the transfer information from the master disk 46 to the slave surface of the slave disk 40. Another arrangement may alternatively be adopted in which the magnetic transfer head 130 provided as a magnetic field generation device is moved by being rotated.

Figure 9A:
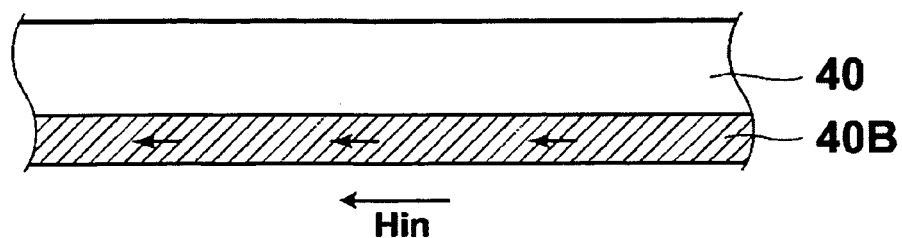
FIGS. 9A to 9C are sectional views for explaining a basic process for magnetic transfer.
Figure 9B:
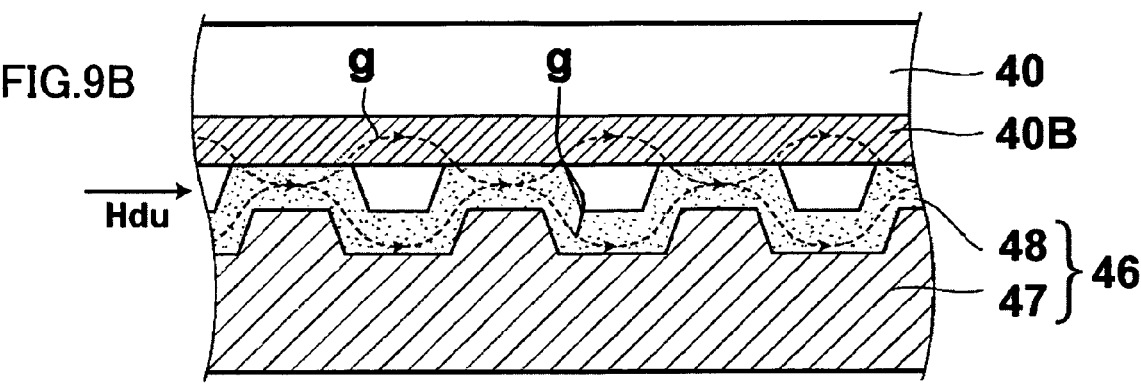
Figure 9C:
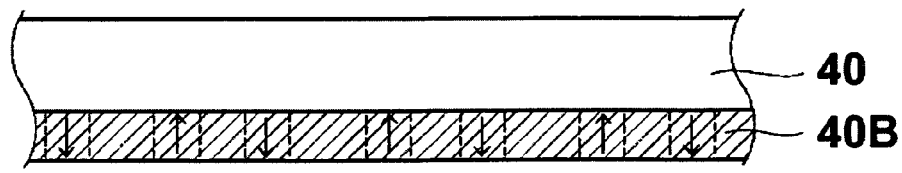

FIGS. 9A to 9C are sectional views for explaining a basic process for this magnetic transfer. FIG. 9A shows the slave disk 40 alternating-current-demagnetized, FIG. 9B shows a step in which a magnetic field is applied to the master disk 46 and the slave disk 40 while these disks are maintained in close contact with each other, and FIG. 9C shows the slave disk 40 after magnetic transfer. In FIGS. 9A and 9C, only the magnetic recording layer 40B on the lower side is shown with respect to the slave disk 40. Each figure is a schematic diagram showing the sizes of portions of the disk in proportions different from the actual proportions.

As already described with reference to FIG. 8, magnetic transfer is performed by maintaining the surface of the slave disk 40 on the magnetic recording layer 40B side and the surface of the master disk 46 on the magnetic layer 48 side in close contact with each other, and by applying the transfer magnetic field TG to the track surface of the slave disk 40.

The direction of the transfer magnetic field TG coincides with a direction parallel to the film surface of the magnetic recording layer 40B of the slave disk 40. As shown in FIG. 9B, leakage fluxes g corresponding to the configuration pattern of the magnetic layer 48 are generated through the surface of the master disk 46 by application of the transfer magnetic field TG.

The leakage fluxes g essentially contain large amounts of components in a direction parallel to the film surface of the magnetic layer 48, but have comparatively large components in the perpendicular direction in the vicinity of the opposite ends of each configuration pattern element of the magnetic layer 48. Therefore, a recording magnetization pattern corresponding to the configuration pattern of the magnetic layer 48 is recorded on the slave disk 40 by the vertical-direction-component magnetic fields of the leakage fluxes g, as shown in FIG. 9C.

In FIG. 9C, a hatched area shown at the boundary at which the orientation of the recording magnetization pattern is reversed indicates a magnetization transition region.

As a result, information (e.g. the servo signal) according to the projection pattern elements 47A (see FIG. 7A) of the master disk 46 is magnetically transferred and recorded to the magnetic recording layer 40B of the slave disk 40, as shown in FIG. 9.

While magnetic transfer from the master disk 46 under the slave disk 40 to the magnetic recording layer 40B of the slave disk 40 on the lower side of the slave disk 40 has been described with reference to FIG. 9, magnetic transfer to the magnetic recording layer on the upper side of the slave disk 40 can also be performed in the same manner as magnetic transfer to the lower magnetic recording layer simultaneously with the same by maintaining the master disk 46 in close contact with the upper surface of the slave disk 40.

The slave disk 40 to which information has been magnetically transferred can be suitably used by being incorporated in a magnetic recording apparatus (hard disk drive). As a hard disk drive used in this application, any of well-known apparatuses put on the market by drive makers may be used.

The embodiment of the perpendicular magnetic recording medium initialization method, the perpendicular magnetic recording medium and the magnetic recording apparatus according to the present invention has been described. However, the present invention is not limited to the described embodiment and can include various implementation forms.

For example, while in the described embodiment, as shown in FIG. 6, the master disk 46 has a pattern of magnetic layer 48 portions formed on the projection pattern on one surface of the substrate 47 provided as a nonmagnetic substrate, an arrangement in which a protection pattern of magnetic layer 48 portions are formed on one surface of a flat substrate formed of a nonmagnetic substrate may alternatively be adopted.

Also, an arrangement in which a pattern configuration formed of ferromagnetic thin film is arranged by being embedded in a surface layer portion of a flat substrate formed of a nonmagnetic substrate, and in which no projections/recesses are formed on the substrate surface may be adopted in place of the arrangement shown in FIG. 6.

Further, while each of the elements in the magnetic layer 48 shown in FIG. 6 has a rectangular as seen in plan, the elements can be formed into any of various shapes other than rectangular shapes according to use in actual applications.

While in the described embodiment the electromagnet device 134 in the magnetic field generation device 130 is provided on the upper side of the slave disk 40, the arrangement may alternatively be such that a magnetic field is applied by disposing two magnet devices (bar magnets) on the upper side of the slave disk 40 in a state of being spaced apart from each other. The magnet device may be an electromagnet or a permanent magnet.

EXAMPLES

[Making of Slave Disk]

The slave disk 40 was made under conditions described below, and a predetermined signal was recorded by perpendicular magnetic recording. Alternating current demagnetization was thereafter performed by using the demagnetization device 10 shown in FIG. 2 to evaluate the signal transferred to the slave disk 40.

The slave disk 40 was provided in the form of a thin-film glass hard disk. A hard disk having an outside diameter of 95 mm (3.5 inch type) and having a magnetic layer having a CoCrPt film thickness of 25 nm, a magnetic flux density Ms of 5.7 T (4500 Gauss) and a coercive force Hc of 199 kA/m (2500 Oe) was made by using a vacuum film forming apparatus, decompressing to a pressure of $1.33 \times 10^{-5}$ Pa ($10^{-7}$ Torr) at room temperature, introducing argon gas to set the atmosphere to 0.4 Pa ($3 \times 10^{-3}$ Torr) and heating the glass plate to 200° C. under this condition.

The transferred signal was evaluated by a method described below.

[Evaluation of Transferred Signal]

The magnetized state of the slave disk 40 was evaluated with an electromagnet conversion characteristic measuring apparatus (a product from Kyowadenshi. co., Ltd., Model No:

LS-90). A GMR head having a head gap of 0.06 μm and a track width of 0.14 μm was used.

A read signal was frequency-decomposed by a spectrum analyzer to measure the difference (C/N) between a peak intensity C of a primary signal and extrapolated noise N.

The difference in C/N ratio (in dB) before and after alternating current demagnetization was plotted in FIGS. 10 and 11 with respect to the strength of an externally applied magnetic field, as described below.

[Alternating Current Demagnetization Condition: Experiment 1]

Alternating current demagnetization was performed by changing the strength of the externally applied magnetic field. The ratio of the parallel component intensity HexP of the externally applied magnetic field and the coercive force Hc of the slave disk 40 was plotted along the abscissa, while the difference in C/N ratio (in dB) after alternating current demagnetization was plotted along the ordinate. FIG. 10 shows the results.

Figure 10:
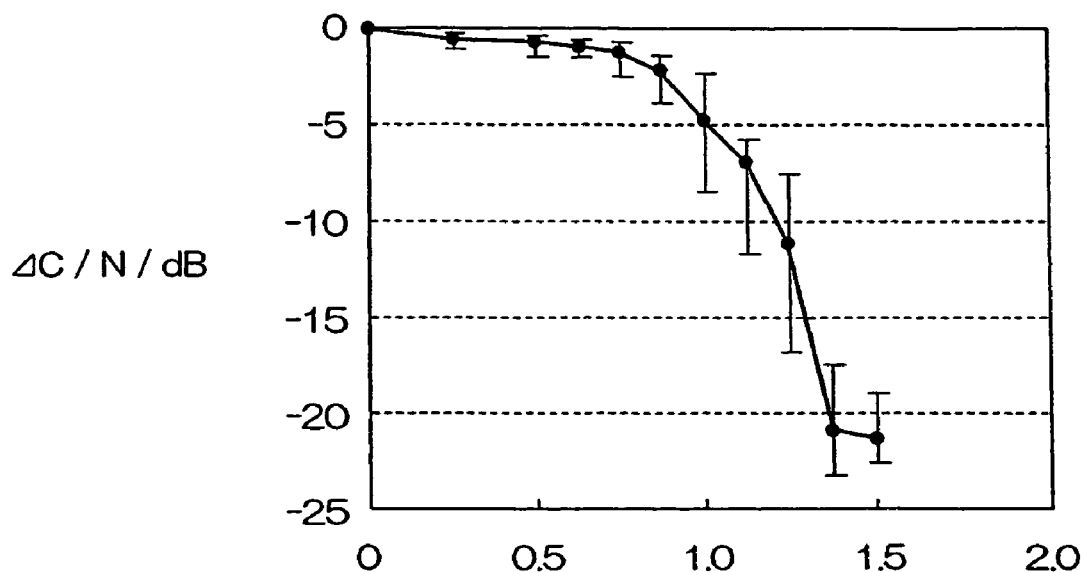
FIG. 10 is a graph showing the results of an example of the present invention.

From FIG. 10, it can be understood that control for satisfying HexP>1.3×Hc ensures that low-noise alternating current demagnetization can be performed in a shorter time in comparison with the method of demagnetization by head writing.

[Alternating Current Demagnetization Condition: Experiment 2]

Alternating current demagnetization was performed by changing the strength of the externally applied magnetic field. The ratio of the perpendicular component intensity HexV of the externally applied magnetic field and the coercive force Hc of the slave disk 40 was plotted along the abscissa, while the difference in C/N ratio (in dB) before and after alternating current demagnetization was plotted along the ordinate. FIG. 11 shows the results.

Figure 11:
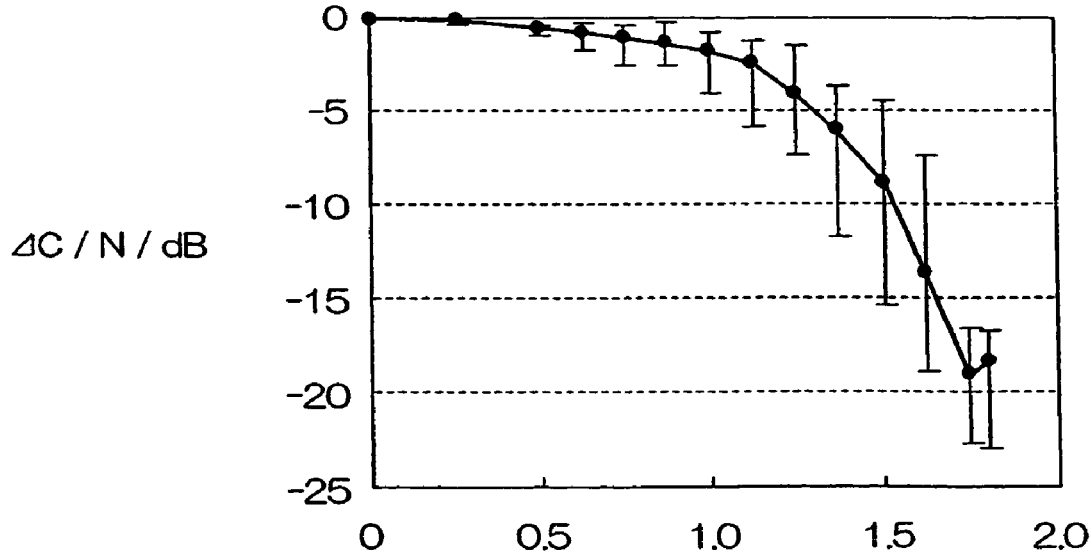
FIG. 11 is a graph showing the results of an example of the present invention.

From FIG. 11, it can be understood that control for satisfying HexV<Hc ensures that low-noise alternating current demagnetization can be performed in a shorter time in comparison with the method of demagnetization by head writing.

What is claimed is:

1. A method of initializing a perpendicular magnetic recording medium in which a magnetic field having a magnetic field strength Hex is applied to a perpendicular magnetic recording medium having a magnetic layer having a coercive force Hc to initialize the magnetic layer, the method comprising:

generating, using a magnetic field generating device which has a pair of magnetic poles including two magnetic poles placed on a same surface side of the perpendicular magnetic recording medium, a flux loop of a demagnetization magnetic field having magnetic field lines parallel to a circumferential direction of the perpendicular magnetic recording medium by the pair of magnetic poles;

applying the demagnetization magnetic field to the perpendicular magnetic recording medium along the circumferential direction of the perpendicular magnetic recording medium to alternating-current-demagnetize the perpendicular magnetic recording medium by moving the perpendicular magnetic recording medium in the circumferential direction relative to the magnetic field generating device to make the magnetic layer of the perpendicular magnetic recording medium pass under the flux loop;

controlling a magnetic field strength HexP of the demagnetization magnetic field in a direction parallel to the medium surface so that HexP>1.3×Hc; and controlling a magnetic field strength HexV of the demagnetization magnetic field in a direction perpendicular to the medium surface so that HexV<Hc.

2. A perpendicular magnetic recording medium initialized by the method of initializing a perpendicular magnetic recording medium according to claim 1, wherein the perpendicular magnetic recording medium undergoes magnetic transfer of a magnetic pattern formed of an array of magnetic layer portions on a surface of a perpendicular magnetic transfer master disk, which is a disk-like substrate, according to information to be transferred to the perpendicular magnetic recording medium by applying a transfer magnetic field while the perpendicular magnetic transfer master disk is being maintained in close contact with the perpendicular magnetic recording medium.

3. A magnetic recording apparatus comprising the perpendicular magnetic recording medium according to claim 2.

4. The method of initializing a perpendicular magnetic recording medium according to claim 1, further comprising:

a gap extending along a radial direction of the perpendicular magnetic recording medium, between the pair of magnetic poles, wherein the flux loop is generated in the gap.

5. A magnetic recording method for recording a predetermined magnetic pattern on a perpendicular recording medium having a magnetic layer with a coercive force Hc, comprising:

initializing the magnetic layer:

by generating, using a first magnetic field generating device which has a first pair of magnetic poles including two magnetic poles placed on a same surface side of the perpendicular magnetic recording medium, a flux loop of a demagnetization magnetic field having magnetic field lines parallel to a circumferential direction of the perpendicular magnetic recording medium by the first pair of magnetic poles; and by applying the demagnetization magnetic field having a magnetic field strength of Hex along the circumferential direction of the perpendicular magnetic recording medium to alternating-current-demagnetize the perpendicular magnetic recording medium while moving the perpendicular magnetic recording medium in the circumferential direction relative to the first magnetic field generating device to make the magnetic layer of the perpendicular magnetic recording medium pass under the flux loop; and transferring a magnetic pattern to the perpendicular magnetic recording medium using a vertical-direction-component magnetic field of a leakage flux:

by generating, using a second magnetic field generating device which has a second pair of magnetic poles including two magnetic poles placed on a same surface side of the perpendicular magnetic recording medium and a perpendicular magnetic transfer master disk being a substrate in disk form on which a pattern formed of an array of magnetic layer portions according to information to be transferred to the perpendicular magnetic recording medium are formed on its surface, a flux loop of a transfer magnetic field having magnetic field lines parallel to the circumferential direction of the perpendicular magnetic recording medium by the second pair of magnetic poles while bringing the perpendicular magnetic recording medium initialized in the initialization step into close contact with the perpendicular magnetic transfer master disk; and by applying the transfer magnetic field along a circumferential direction of the perpendicular magnetic transfer master disk to generate the leakage flux corresponding to the pattern on the perpendicular magnetic transfer master disk while moving the perpendicular magnetic recording medium and the perpendicular magnetic transfer master disk brought into close contact with each other relative to the second magnetic field generating device in the circumferential direction of the perpendicular magnetic transfer master disk to make the perpendicular magnetic recording medium and the perpendicular magnetic transfer master disk pass under the flux loop of the transfer magnetic field, wherein in the initializing operation, a magnetic field strength HexP of the demagnetization magnetic field in a direction parallel to a surface of the perpendicular magnetic recording medium is controlled to be HexP>1.3×Hc; and a magnetic field strength HexV of the demagnetization magnetic field in a direction perpendicular to the surface of the perpendicular magnetic recording is controlled to be HexV<Hc.

6. The magnetic recording method according to claim 5, wherein a first gap extending along a radial direction of the perpendicular magnetic recording medium is provided between the first pair of magnetic poles in the first magnetic field generating device, and the flux loop of the demagnetization magnetic field is generated in the first gap; and a second gap extending along the radial direction of the perpendicular magnetic recording medium is provided between the second pair of magnetic poles in the second magnetic field generating device, and the flux loop of the transfer magnetic field is generated in the second gap.

7. A manufacturing method of a perpendicular magnetic recording medium, comprising obtaining a perpendicular magnetic recording medium on which a magnetic pattern corresponding to a servo signal is recorded by performing the magnetic recording method according to claim 5

.

* * * * *